(12) United States Patent
Pineau et al.

(10) Patent No.: US 8,783,313 B2
(45) Date of Patent: Jul. 22, 2014

(54) TIRE TREAD WITH DIRECTIONAL PATTERN

(75) Inventors: Jacky Pineau, Blanzat (FR); Matthieu Bonnamour, Pont du Chateau (FR); Sébastien Fugier, Saint-Bonnet-Pres-Riom (FR)

(73) Assignees: Compagnie Generale des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 680 days.

(21) Appl. No.: 13/059,420

(22) PCT Filed: Aug. 6, 2009

(86) PCT No.: PCT/EP2009/060222
§ 371 (c)(1),
(2), (4) Date: Mar. 29, 2011

(87) PCT Pub. No.: WO2010/023076
PCT Pub. Date: Mar. 4, 2010

(65) Prior Publication Data
US 2011/0168312 A1    Jul. 14, 2011

(30) Foreign Application Priority Data

Aug. 26, 2008 (FR) ........................................ 08 55712

(51) Int. Cl.
*B60C 11/03* (2006.01)

(52) U.S. Cl.
USPC .................................. 152/209.28; 152/209.9

(58) Field of Classification Search
CPC  B60C 11/0302; B60C 11/03; B60C 11/0304; B60C 11/0332; B60C 11/13; B60C 11/1369; B60C 2011/0339; B60C 2011/0358; B60C 2011/0372; B60C 2011/0353; B60C 2011/0365; B60C 2011/0374; B60C 2011/3026
USPC .......... 152/209.28, 903, 209.8, 209.9, 209.18
See application file for complete search history.

(56) References Cited

U.S. PATENT DOCUMENTS

| 4,057,089 A | 11/1977 | Johannsen |
| 4,667,717 A * | 5/1987 | Graas ....................... 152/209.18 |
| 5,234,042 A | 8/1993 | Kuhr et al. |

FOREIGN PATENT DOCUMENTS

| EP | 0 064 934 A2 | 11/1982 |
| EP | 0 721 853 A1 | 7/1996 |

(Continued)

OTHER PUBLICATIONS

International Search Report and Written Opinion dated Mar. 11, 2009 for French Application No. 0855712.
International Search Report mailed Sep. 17, 2009 for International Application No. PCT/EP2009/060222.

*Primary Examiner* — Eric Hug
(74) *Attorney, Agent, or Firm* — Dickinson Wright PLLC

(57) ABSTRACT

A tread for a tire provided with a pattern comprising a plurality of main grooves formed on each half of the tread on each side of a median plane X-X', each of these main grooves, of mean width L, opening axially to the outside and extending axially inward as far as a distance from the median plane X-X' that is comprised between 2.5 and 10% of the width TW of the tread, these main grooves giving this tread a preferred direction of running, this tread further comprising a plurality of additional grooves comprising a first and a second end, the mean direction connecting the first and second ends forming, with the circumferential direction, a small angle A greater than zero degrees and at most equal to 20 degrees, this tread being characterized in that opening onto each main groove is at least one additional groove and in that the axially innermost end of each additional groove comes into contact with the road surface before the axially outermost end of the same additional groove.

7 Claims, 4 Drawing Sheets

(56) References Cited

FOREIGN PATENT DOCUMENTS

| | | | |
|---|---|---|---|
| EP | 0 893 283 | A2 | 1/1999 |
| EP | 0 916 524 | A2 | 5/1999 |
| EP | 1 238 827 | A1 | 9/2002 |
| EP | 1 437 237 | A2 | 7/2004 |
| EP | 1 637 357 | A1 | 3/2006 |
| JP | 7-215013 | | 8/1995 |

* cited by examiner

TIRE TREAD WITH DIRECTIONAL PATTERN

BACKGROUND

1. Field

Disclosed herein are tires for passenger cars and more particularly to the treads with which the said tires are provided, and more specifically still relates to the tires intended to be mounted on high-performance vehicles.

2. Description of Related Art

It is known practice to form tread patterns in such a way as to give the tread a directional nature. A directional tire comprises a tread that has a directional pattern such that when the tire turns in the preferred direction, this tire offers better grip than the grip offered when it is turning in the other direction. What is meant by tread pattern is a plurality of cuts made in the said tread in an appropriate pattern, the said cuts having widths and depths which are likewise appropriate. What is meant by cuts is either grooves or incisions, the latter (the incisions) differing from the former in terms of the widths (distances between opposing faces) which are generally smaller than 2 mm and more appropriately still, smaller than 1 mm).

A common directional tread pattern has main grooves which are arranged in such a way as to constitute a series of V-shaped grooves all pointing in the same direction right around the tread of the tire. Usually, for maximum grip during acceleration of high-performance vehicles, the V-shaped grooves point in the direction of travel such that the median part (the part close to the median plane of the tire) of each V-shaped groove comes first in the imprint that the tire leaves on the ground.

Examples of this kind of tire are given in European Patents 064934, 0721853, 1238827 or U.S. Pat. No. 4,057,089.

While these patterns do offer a certain advantage when driving on a very wet road surface, it has been found that this type of pattern may present disadvantages during road holding tests on dry road surfaces when the vehicle is being tested at the limits of grip, particularly under cornering. What actually happens is that the curve of transverse thrust as a function of the slip angle of such a tire has a characteristic appearance demonstrating an increase in the said transverse thrust up to a maximum value, followed by an appreciable reduction in transverse thrust for high slip angles (an example of such a curve is shown on the curve identified C0 in FIG. 2 of this document).

Under strong acceleration, and for certain specific maneuvers such as "overturning" or turning at the limit of grip for lateral accelerations in excess of 0.8 times the acceleration due to gravity, this may result in an impairment of the equilibrium of the vehicle fitted with tires provided with such patterns.

Patent document EP0721853 discloses a variant of such a pattern in which a plurality of additional grooves have been introduced. Some of these additional grooves are formed in such a way as to connect pairs of main grooves situated on one and the same side of the tread with respect to the median plane. Other additional grooves are formed to connect pairs of main grooves situated one on each side of the median plane. What is meant by a groove connected to another groove is that an additional groove opens at its ends into main grooves.

These additional grooves here are directed in such a way as to be substantially perpendicular to the main grooves that they connect. Between two main grooves, a first additional groove is formed between the axially inner end of another main groove and a second main groove so as to be substantially perpendicular to the second main groove. This first additional groove makes an angle of close to 45 degrees with the circumferential direction. A second additional groove is formed axially on the outside of this first additional groove. In this prior art, the main grooves and the first additional grooves delimit a plurality of elements that are discontinuous in the circumferential direction, some of the corners of which are subjected to high raised pressures during turning maneuvers (that is to say notably under high transverse acceleration). The additional grooves of this prior art are not good from a transverse rigidity standpoint because when this tread is subjected to a transverse load, notably during a turning maneuver, an appreciable loss of rigidity is observed, giving rise to a reduction in the cornering thrust.

SUMMARY

Therefore a need in the art remained for a pattern for a tire tread fitted to a passenger car that does not have the disadvantages recalled hereinabove and in particular which does not show an appreciable drop in cornering thrust under high transverse stress (under cornering).

To this end, there also remained a need in the art for a tread for a tire provided with a pattern comprising a plurality of main grooves formed on each half of the tread on each side of a median plane X-X', each of these main grooves, of mean width L, opening axially to the outside of the tread and extending axially inward as far as the distance from the median plane of the tread that is comprised between 2.5 and 10% of the width TW of the tread. These main grooves form a pattern of V-shaped overall appearance giving this tread a preferred direction of running such that the axially innermost end of each main groove comes into contact with the road surface before the axially outermost end of the same main groove.

There are also provided a plurality of additional grooves of width I less than the mean width L of the main grooves and comprising a first and a second end, the mean direction connecting the first and second ends making, with the circumferential direction, a small angle A, that is to say an angle at most equal to 20 degrees and greater than zero degrees, the second end being situated a distance D2 away from the median plane which is greater than the distance D1 separating the first end from this same plane, at least the first or the second end being open onto a main groove. Furthermore, the axially inner end of each additional groove—namely the end closest to the said plane—is a distance D1 away from the equatorial plane which is greater than the distance away from the same plane of the first ends of the main grooves and less than 18% of the width TW of the tread.

This tread is such that opening onto each main groove is at least one additional groove and in that the axially innermost end of each additional groove comes into contact with the road surface before the axially outermost end of the same additional groove.

The tread described herein therefore comprises a median part which extends in the circumferential direction and the axially opposite edges of which delimit a plurality of wheat-like ears which give the tread good performance both on a wet road surface and on a dry road surface. By limiting the range from which the angle of the additional grooves is chosen it is possible, along the corners of the continuous central pattern, and particularly on the wheat-like ears, to even out the ground contact pressures, these pressures resulting from the high level of transverse shear of the pattern under certain running conditions.

In addition, the median part of the tread situated on each side of the median plane and which is delimited by the main grooves and the additional grooves has a rigidity under transverse shear stress which is equal or substantially equal to (that is to say it differs only very slightly from) that of a part of like geometry but with no cuts (grooves, incisions), so that the entirety of the load can be transferred from one side of this part to the other in the axial direction. This median part is notably devoid of any circumferential groove. Thanks to a tread described herein, it is possible to obtain uniform operation of the said tread and, in particular, near-uniform distribution of the contact pressures over this median part at the same time avoiding mechanisms that would cause bits of material in this median part to bend over.

In an alternative form described herein, the additional grooves open onto the main grooves only via one end, the other end being distant from another main groove by a distance less than 50% of the mean distance between two main grooves measured in the direction of the additional groove (and more preferably still, less than 25% of the said distance).

In another alternative form, each additional groove opens at both ends into the main grooves on one and the same half of the tread.

The presence of the additional grooves described herein makes it possible to improve the presence of the curves of tire thrust as a function of the slip angle and, as a result, improve the equilibrium of the vehicle in specific maneuvers under very high transverse accelerations.

For preference, the additional grooves have a mean width at least equal to 1.5 mm and at most equal to 4 mm.

In an alternative form described herein, the plurality of main grooves formed on one half of the tread is circumferentially offset by comparison with the plurality of main grooves formed on the other half of the tread.

In an alternative form described herein, it is advantageous for the second additional grooves to connect the main grooves in pairs, these second additional grooves being substantially parallel to the first additional grooves and situated a distance from the equatorial plane comprised between 27 and 37% of the width TW of the tread. What is meant here by substantially parallel is that the additional grooves of one and the same side of the tread deviate angularly from one another by an angle which is 0 or can be as much as 5 degrees.

It is also advantageous for the depths of the first and second additional grooves to be at least 50% of the depth of the main grooves.

BRIEF DESCRIPTION OF THE DRAWINGS

The remainder of the description discloses detailed description of specific embodiments disclosed herein, on the basis of variants which are given by way of nonlimiting examples and explained with the aid of the following figures.

DETAILED DESCRIPTION OF SPECIFIC EMBODIMENTS

Figure 1:
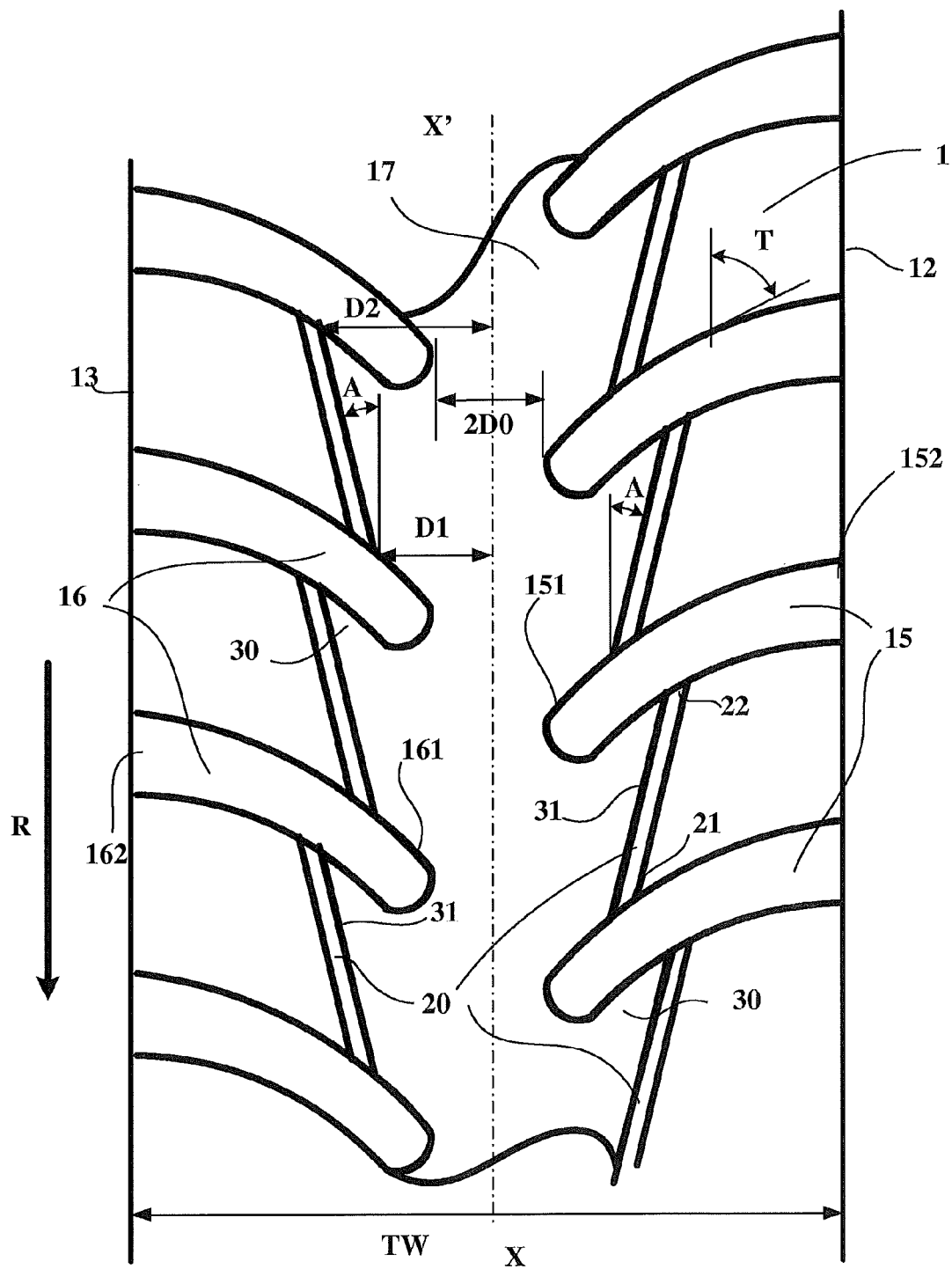
FIG. 1 shows a part elevation of a tread according to embodiments disclosed herein.

Consider FIG. 1 which shows a part elevation of a part of a tread for a tire for a passenger car of size 195/65 R 15. This radial tire comprises a tread 1 that comes into contact with the ground, this tread having two lateral edges 12 and 13 spaced apart by a tread width TW. The lateral edges 12 and 13 correspond to the axially outermost points of the tread that come into contact with the road surface when the tire is subjected to nominal pressure and load conditions.

In the context of the present application, the width of the tread TW is defined as being the longest axial distance of the tire, measured from the imprint made by the tire on the ground when said tire is mounted on a given rim and inflated to a service pressure under nominal load; the terms "axial" and "in the axial direction" refer to distances measured along the axis of rotation of the tire or parallel to this axis.

The tread 1 is extended beyond its lateral edges 12 and 13 by side walls extending as far as beads.

The tire provided with such a tread has a median circumferential plane (termed the median plane X-X') which is perpendicular to the axis of rotation of the tire and located midway between the lateral edges 12 and 13 of the tread 1. The tread is provided on its radially outer surface with a directional pattern formed of main grooves 15 and 16 arranged on each half of the tread (that is to say on each part of the tread on each side of the median plane X-X'). The direction of rotation is indicated by an arrow R in the drawings (this same type of marking may be used on the tire provided with this tread in order to indicate the recommended direction of running in order to enjoy the full advantages of the invention). The main grooves 15 and 16 extend from a median circumferential part 17 which is arranged symmetrically about the median plane X-X', toward a corresponding lateral edge 12 or 13. What is meant by a median circumferential part of the tread is a part extending out to at most 28% of the tread width TW on each side of the median plane X-X'.

Each main groove 15 (or 16) comprises a first end 151 (or 161) and a second end 152 (or 162). The first ends 151, 161 are situated in the median circumferential part 17 without thereby being situated on the median plane X-X'. In this particular instance, the axial distance D0 between each of these first ends and the median plane X-X' is equal to 4% of the width TW of the tread (in the example shown, the distances at which the first ends of the main grooves in the two halves of the tread are situated are equal).

The second ends 152, 162 of the main grooves open onto the lateral edges 12, 13 of the tread.

The main grooves 15, 16 have mean widths ranging from 5 mm to 8.5 mm and a mean depth equal to 8.5 mm and are arranged in such a way as to generate overall a design in the shape of a V; the point of this V indicating the preferred direction of rotation chosen for this pattern. The geometric shape of each main groove is such that the angle T of the tangent to the corners formed on the tread by these main grooves with a direction contained in the median plane X-X' increases with the distance between the point of tangency considered and the said plane. Moreover, and as may be seen in this FIG. 1, the main grooves 15 of one half of the tread are offset in the circumferential direction by comparison with the main grooves 16 of the other half. The offset is substantially equal to half the distance there is between adjacent main grooves on one and the same half of the tread. In another variant which has not been depicted here, the main grooves can have no circumferential offset relative to one another.

Furthermore, this pattern comprises, on each half of the tread and entirely contained in the median circumferential part 17, a plurality of additional grooves 20 of a width equal to 3 mm and of mean orientation A equal in this instance to 4 degrees, this orientation being measured with respect to a direction tangential to the circumferential direction. Each additional groove 20 comprises a first end 21 and a second end 22, the first end 21 being situated at an axial distance D1 away from the median plane X-X' which is equal in this instance to 13% of the width TW of the tread, the second end 22 being situated at an axial distance D2 away from the median plane X-X' which is equal to 14% of the width TW of the tread. In this variant, each additional groove 20 opens at its two ends into consecutive main grooves 15, 16 of one and the same half of the tread. For preference, the angle A of the additional grooves with circumferential direction is small, that is to say greater than zero degrees and at most equal to 20 degrees; more preferably still, the angle A is at least equal to 4 degrees and at most equal to 15 degrees.

The presence of these additional grooves 20 which are located precisely as has just been specified, creates additional corners which are oriented at a small angle with respect to a circumferential direction and in a direction which is the same as that of the branches of the V formed by the main grooves (that is to say these corners, in virtual prolongation, form a V facing in the same direction as the V formed by the main grooves).

Through this careful arrangement, it is possible to obtain a continuous median element 17 provided on these lateral faces with a plurality of wheat-like ears 30 of specific geometry particularly effective under high cornering stresses (that is to say at slip angles beyond the thrust maximum). These wheat-like ears 30 have a lateral corner 31 which is inclined by an angle A allowing it to react transverse load under high lateral acceleration and thus create a near constant and uniform pressure field particularly along the said lateral corner 31. Moreover, the presence of the additional grooves 20 gives rise to decoupling between the median circumferential part 17 of the tread and those elements of the tread which are axially on the outside of the said additional grooves (hinge effect). The absence of groove in the continuous median circumferential part 17 contributes towards maintaining good ground contact and thereby to ensuring effective transfer of axial load applied by the ground.

Thanks to these measures, it is found that the curve that plots transverse thrust force of the tire against the ground as a function of the slip angle of the tire (the angle that the plane of the tire makes with respect to the path being followed) and for significant slip angles (beyond the maximum reaction value), the thrust force experiences less of a reduction than is the case with known tread patterns. During the phases of transverse stressing at significant slip angles (that is to say angles beyond the slip angle that corresponds to the maximum thrust value), the key role that the wheat-like ear shape of the central pattern plays can be seen, this wheat-like ear shape performing a stabilizing role because it allows the maximum level of thrust to be maintained irrespective of the slip angle adopted.

If an inclination in excess of the fixed limit is adopted, it is found that the curve of thrust as a function of the slip angle once again shows a marked downturn. It is found that the choice of the parameters such as position and angle of the additional grooves is, surprisingly, essential to obtaining the desired effect, namely to almost preserving the maximum level of thrust at very high slip angles.

Figure 2:
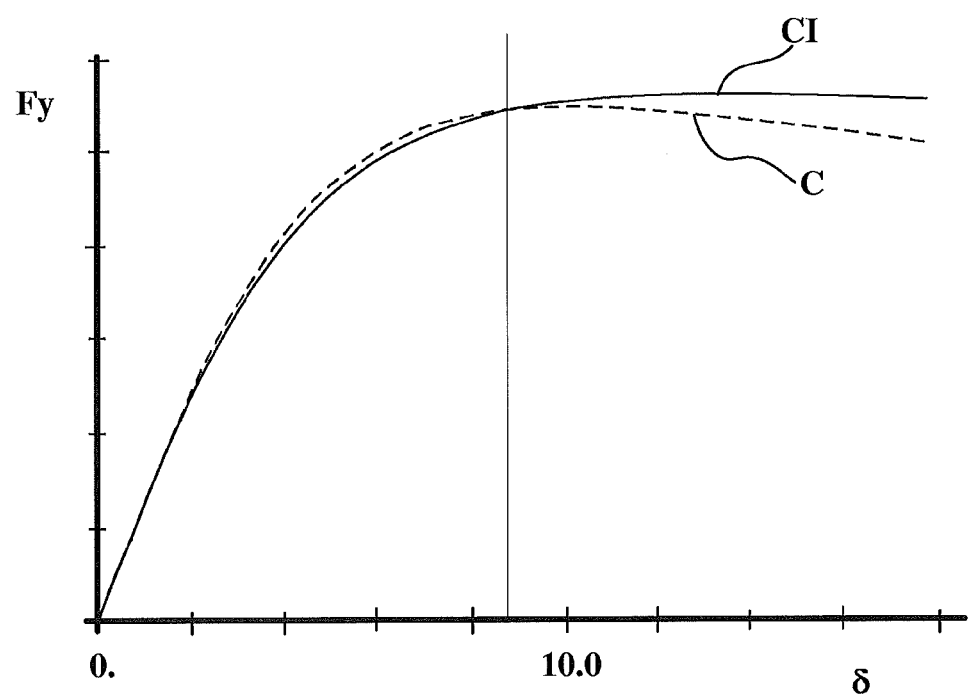
FIG. 2 shows the recorded curves of cornering thrusts of a tire according to embodiments disclosed herein and of a tire according to the related art.

FIG. 2 shows a comparison between curves of transverse thrust Fy recorded with a tire according to an embodiment disclosed herein (curve Ci) which has just been described, and a tire according to the related art (curve C), the latter being identical to the tire of the embodiment disclosed herein except that it is provided with additional grooves that make an angle of 30 degrees with a tangent to the circumferential direction. It is found that, for slip angles δ greater than the slip angle that gives rise to maximum thrust, whereas the tire according to the related art suffers appreciable loss of transverse thrust from the ground on the tire, the tire of the embodiment disclosed herein logs a thrust of near constant value.

Figure 3:
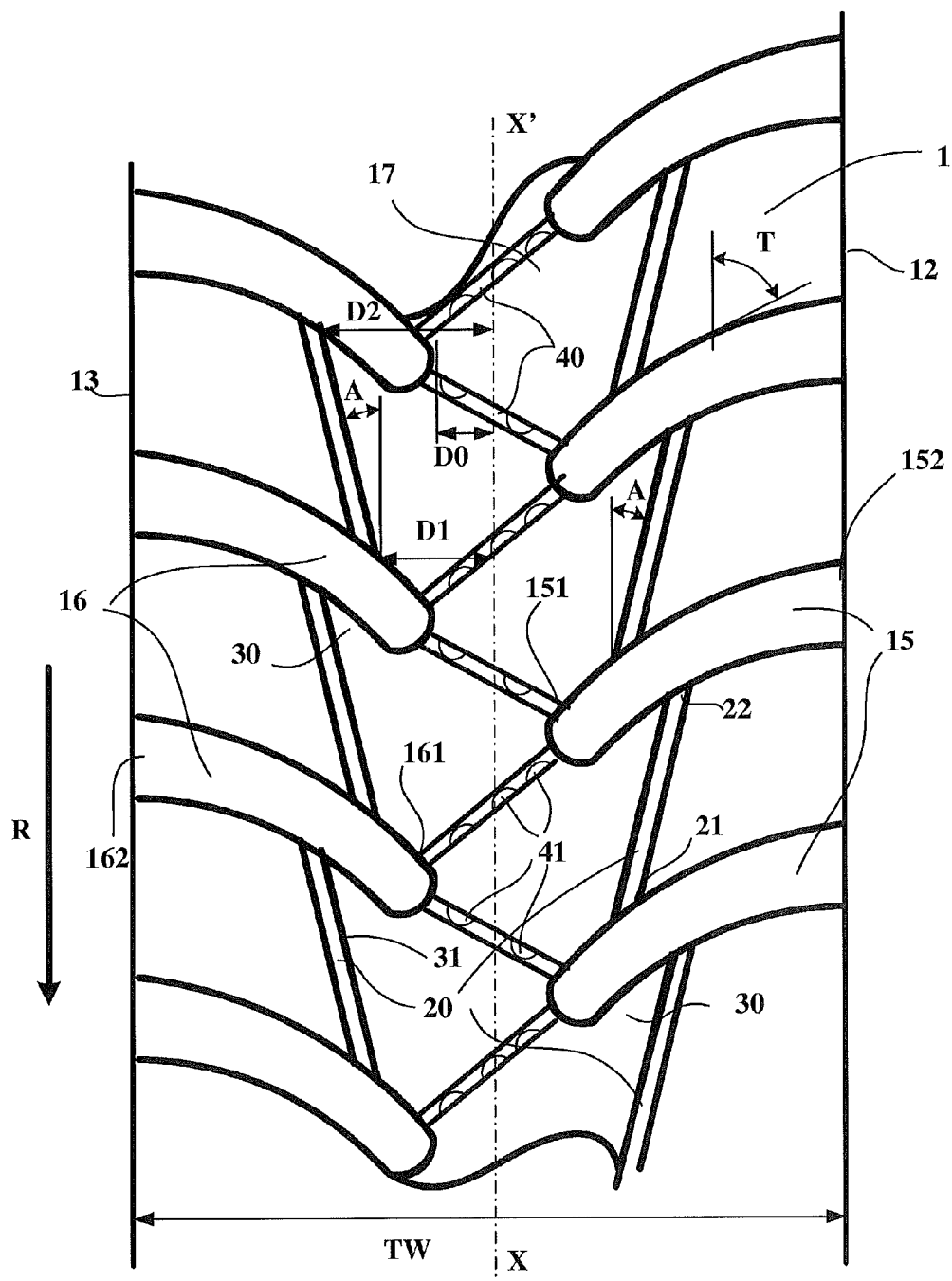
FIG. 3 shows a part elevation of a tread according to a variant disclosed herein.

The variant according to the embodiment disclosed herein which has just been described with the support of FIG. 1 can be further improved by providing the median circumferential part 17 with a plurality of oblique grooves 40 connecting the ends 151 of the main grooves 15 of one half of the tread to the ends 161 of the main grooves 16 of the other half of the tread as has been shown in FIG. 3. Of course, in order to obtain the technical effect of the embodiments disclosed herein, it is absolutely essential for these oblique grooves 40 to be provided with protrusions 41 which prevent these grooves from closing up while at the same time transferring all of the transverse load (parallel to the axis of rotation) from one side of the circumferential central part to the other side of that same part. Thanks to the instantaneous or near-instantaneous contact between the said faces when the transverse loads are generated by the ground on the tread surface of the tread under cornering maneuvers and under braking on dry ground, it is possible for the median circumferential part 17 to maintain good transverse rigidity while at the same time enjoying additional corners which are of use especially on a road surface that is covered with water. The protrusions are arranged on the walls delimiting the oblique grooves 40 in such a way that they remain present whatever the level of tread wear.

For preference, these oblique grooves 40 have widths equal to the widths of the additional grooves 20 and have a depth equal to the depth of the additional grooves.

Figure 4:
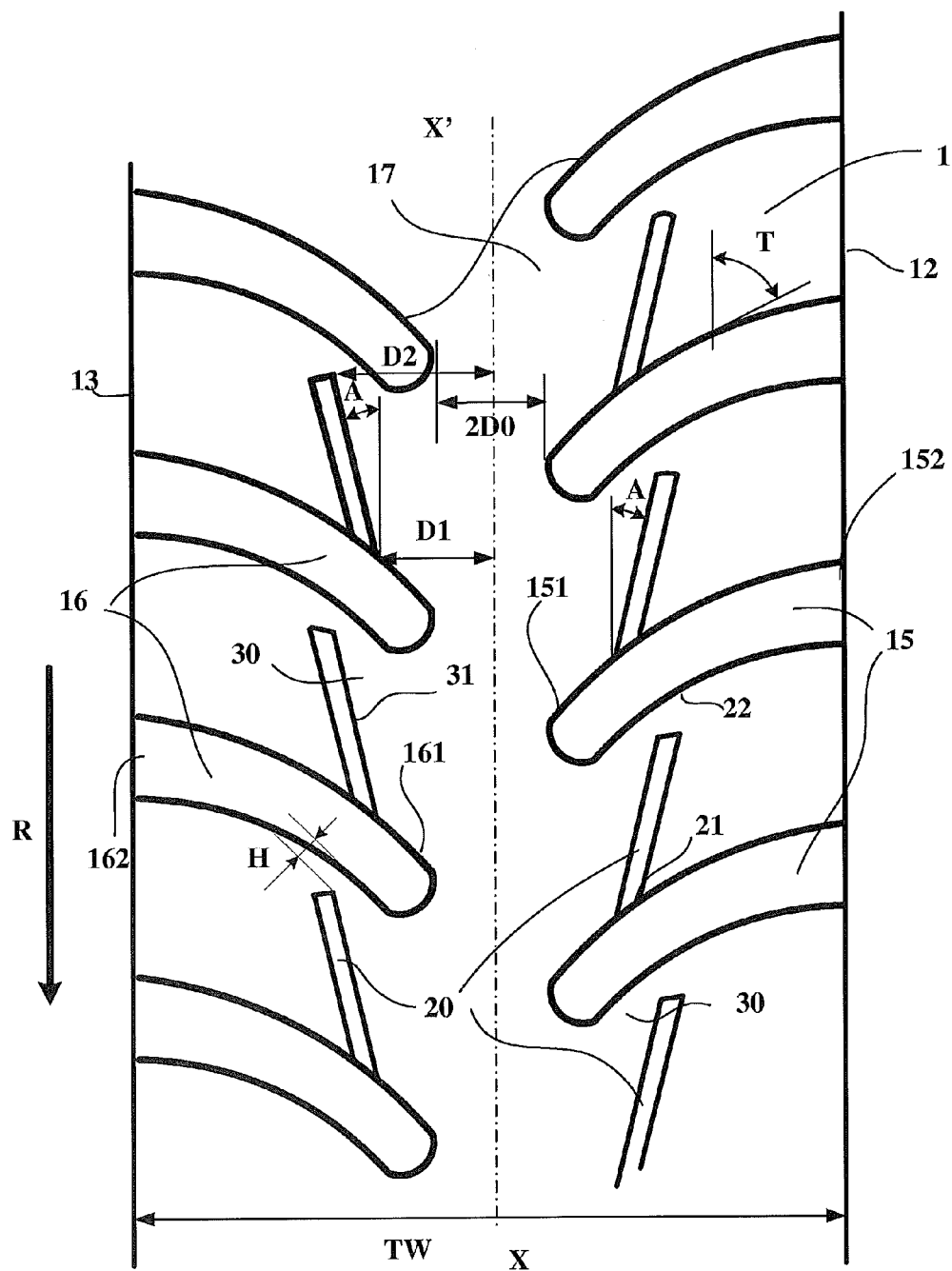
FIG. 4 shows a part elevation of a tread according to another variant disclosed herein.

FIG. 4 shows a variant tread pattern according to the embodiments disclosed herein for a tread with which a tire of the same size as the one used in FIG. 1 is equipped. Moreover, the same references are used to denote the same structural elements. In this variant, the additional grooves 20 open only via a first end 21 into a main groove 15 (or 16). The distance H between the second end 22 and the nearby main groove is less than 50% of the distance D3 measured between two main grooves in the direction of the additional groove and, in the variant shown, this distance H is equal to 20% of the distance D3. In this variant, the median part of the tread is delimited by the main grooves and the additional grooves, the latter being extended virtually as far as another main groove.

It is clear to a person skilled in the art that various modifications can be made above and beyond the specific embodiments which have been described and depicted for the purposes of illustrating the embodiments disclosed herein, and without departing from the scope disclosed herein. Thus, for example, the geometric shape of the additional grooves could be altered, giving them a curved rather than straight configuration or alternatively further additional grooves could be added axially on the outside of the first additional grooves. It is also possible to have main grooves on each half of the tread such that their axially inner ends are not all the same distance away from the median plane.

The invention having been described herein with respect to certain of its specific embodiments and examples, it will be understood that these do not limit the scope of the appended claims.

The invention claimed is:

1. A tread for a tire comprising a radially outer surface provided with a pattern comprising:
   a plurality of main grooves formed on each half of the tread on each side of a median plane X-X' and extending radially inward from the radially outer surface of the tread, each of these main grooves, of mean width L, opening axially to the outside and extending axially inward as far as a distance from the median plane X-X' that is comprised between 2.5 and 10% of the width TW of the tread, these main grooves forming a pattern of V-shaped overall appearance and giving this tread a preferred direction of running such that the axially innermost end of each main groove comes into contact with the road surface before the axially outermost end of the same main groove, a plurality of additional grooves extending radially inward from the radially outer surface of the tread, each of these additional grooves having a width I less than the mean width L of the main grooves and comprising a first and a second end, wherein the additional grooves open at both the first end and the second end directly onto a main groove, wherein the mean direction connecting the first and second ends of each additional groove forms, with the circumferential direction, an angle A greater than zero degrees and at most equal to 20 degrees, wherein the second end of each additional groove is situated at a distance D2 from the median plane X-X' which is greater than the distance D1 between that same plane and the first end of the same additional groove, which distance D1 is greater than a distance D0 away from that same plane of first ends of the main grooves, wherein the distance D1 is less than 18% of the width TW of the tread, wherein the main grooves and the additional grooves delimit a median part extending in the circumferential direction and having axially opposite ends, which delimit a plurality of wheat-like ears, wherein the axially innermost end of each additional groove comes into contact with the road surface before the axially outermost end of the same additional groove, and wherein the median part comprising a plurality of wheat-like ears is devoid of any circumferential groove; and oblique grooves connecting the main grooves of one half of the tread to the main grooves of the other half of the tread, each of the oblique grooves comprising opposing faces that delimit them, and projections on said opposing faces that prevent the oblique grooves from closing up under braking.

2. The tread according to claim 1 wherein the plurality of main grooves formed on one half of the tread is circumferentially offset by comparison with the plurality of main grooves formed on the other half of the tread.

3. The tread according to claim 1 wherein the angle A that the additional grooves make with the circumferential direction is at least equal to 4 degrees and at most equal to 15 degrees.

4. The tread according to claim 2 wherein the angle A that the additional grooves make with the circumferential direction is at least equal to 4 degrees and at most equal to 15 degrees.

5. A tread for a tire comprising a radially outer surface provided with a pattern comprising:

a plurality of main grooves formed on each half of the tread on each side of a median plane X-X' and extending radially inward from the radially outer surface of the tread, each of these main grooves, of mean width L, opening axially to the outside and extending axially inward as far as a distance from the median plane X-X' that is comprised between 2.5 and 10% of the width TW of the tread, these main grooves forming a pattern of V-shaped overall appearance and giving this tread a preferred direction of running such that the axially innermost end of each main groove comes into contact with the road surface before the axially outermost end of the same main groove, a plurality of additional grooves extending radially inward from the radially outer surface of the tread, each of these additional grooves having a width I less than the mean width L of the main grooves and comprising a first and a second end, wherein the mean direction connecting the first and second ends forming, with the circumferential direction, an angle A greater than zero degrees and at most equal to 20 degrees, wherein the second end is situated at a distance D2 from the median plane X-X' which is greater than the distance D1 between that same plane and the first end, wherein at least the first or the second end opens directly onto a main groove, wherein the axially inner end of each additional groove, namely the end closest to the median X-X', is a distance D1 away from the equatorial plane, which is greater than the distance D0 away from that same plane of first ends of the main grooves, this distance D1 being less than 18% of the width TW of the tread, wherein the second end of the additional grooves is located, relative to a main groove, at a distance H greater than zero and less than 20% of the distance D3 between two following main grooves in the direction of the additional groove, wherein the main grooves and the additional grooves delimiting a median part extending in the circumferential direction and having axially opposite ends which delimit a plurality of wheat-like ears, wherein each main groove has at least one additional groove opening directly onto the main groove, wherein the axially innermost end of each additional groove comes into contact with the road surface before the axially outermost end of the same additional groove, and wherein the median part comprising a plurality of wheat-like ears is devoid of any circumferential groove; and oblique grooves connecting the main grooves of one half of the tread to the main grooves of the other half of the tread, each of the oblique grooves comprising opposing faces that delimit them, and projections on said opposing faces that prevent the oblique grooves from closing up under braking.

6. The tread according to claim 5 wherein the plurality of main grooves formed on one half of the tread is circumferentially offset by comparison with the plurality of main grooves formed on the other half of the tread.

7. The tread according to claim 5 wherein the angle A that the additional grooves make with the circumferential direction is at least equal to 4 degrees and at most equal to 15 degrees.

* * * * *